United States Patent [19]

Baarsch

[11] Patent Number: 4,970,035

[45] Date of Patent: Nov. 13, 1990

[54] PROCESS FOR THE PRODUCTION OF OPEN PORE CERAMIC BODIES AND CERAMIC BODIES PRODUCED ACCORDING TO THIS METHOD

[75] Inventor: Kurt Baarsch, Achim-Baden, Fed. Rep. of Germany

[73] Assignee: E. Dittrich KG "Schlussel"-Erzeugnisse, Bremen, Fed. Rep. of Germany

[21] Appl. No.: 307,195

[22] Filed: Feb. 3, 1989

Related U.S. Application Data

[63] Continuation of Ser. No. 116, Jan. 2, 1987, abandoned.

[30] Foreign Application Priority Data

Jan. 3, 1986 [DE] Fed. Rep. of Germany ....... 3600048

[51] Int. Cl.$^5$ ............................................ C04B 35/64
[52] U.S. Cl. ........................................ 264/59; 264/44; 264/317
[58] Field of Search ............................ 264/59, 44, 317

[56] References Cited

U.S. PATENT DOCUMENTS

| | | |
|---|---|---|
| 3,090,094 | 5/1963 | Schwartzwalder et al. |
| 3,539,667 | 11/1970 | Nameishi ............................. 264/59 |
| 3,939,002 | 2/1976 | Wasbourne .......................... 264/44 |
| 4,083,905 | 4/1978 | Insley .................................. 264/44 |

FOREIGN PATENT DOCUMENTS 2453269 5/1975 Fed. Rep. of Germany.
57-179061 4/1982 Japan .................................... 264/59

*Primary Examiner*—James Derrington
*Attorney, Agent, or Firm*—Merchant, Gould, Smith, Edell, Welter & Schmidt

[57] ABSTRACT

The invention concerns a process for the production of open pore ceramic bodies, wherewith is applied onto the contacting areas of the pores of an open pore matrix body a hardenable ceramic mass, this latter next being hardened and the matrix body being removed, there remaining behind a ceramic body of hardened, open pore ceramic mass. Before curing the ceramic mass, the matrix body is furnished with filaments extending, at least in one spatial direction, into this matrix body, which are removed during or after curing of the ceramic mass while forming appropriate channels. The invention further concerns an open pore matrix body for the production of an open pore ceramic body with at least one filament being provided therein, in particular a thread and/or a wire for forming a channel in the open pore ceramic body; furthermore an open pore ceramic body with a channel formed by removal, during or after hardening of the ceramic mass, of a filament, thread or wire that was introduced before hardening of the ceramic mass, along with use of the open pore ceramic body for cleaning (purifying) and/or transformation of fluid substances.

8 Claims, 4 Drawing Sheets

PROCESS FOR THE PRODUCTION OF OPEN PORE CERAMIC BODIES AND CERAMIC BODIES PRODUCED ACCORDING TO THIS METHOD

This is a continuation of application Ser. No. 000,116, filed Jan. 2, 1987, now abandoned.

TECHNICAL FIELD

The invention concerns a process for the production of open pore ceramic bodies, wherein a hardenable ceramic mass is applied onto the contacting areas of the pores of an open pore matrix body, this latter next being hardened and the matrix body being removed, there remaining behind a ceramic body of hardened, open pore ceramic mass, and an open pore matrix body for the production of an open pore ceramic body along with an open pore ceramic body and its application.

BACKGROUND OF THE INVENTION

Open pore ceramic bodies, as for example have been disclosed in U.S. Pat. No. 3,090,094, serve, for example, as heat-resistant filters for molten metals, as heat-resistant catalyst carriers and for a plurality of other applications that make use of the fine pore structure of the ceramic body.

These types of open pore ceramic bodies are usually obtained by immersing an open pore matrix body made of a suitable, thermically decomposable or volatilizable material into a fluid ceramic mass that penetrates into the open pore system of the matrix body, and first, essentially, filling this latter. Suited as fluid ceramic masses are pastes made of finely-distributed ceramic powders with the addition of binding agents. After as complete as possible wetting of the contacting surfaces of the matrix body pores, the matrix body is removed from the ceramic mass and is rid of the excess of ceramic mass by expressing it, or by a comparable process. In doing this, a certain amount of the ceramic mass remains behind inside the matrix body, which covers the contacting surfaces of the pores with a relatively thin layer and, otherwise, leaves open the inside of the pores. Next, the ceramic mass is hardened, for example by drying and subsequent heating, possibly up to the point of vitrifying the ceramic particles together into an essentially one-piece body. In doing this, the matrix body is thermically volatilized or decomposed, with the product of decomposition escaping in the form of a gas. The ceramic body thereby remaining behind and consisting of the hardened, open pore ceramic mass, is furnished for the usages mentioned.

Resulting with this process for the production of an open pore ceramic body is an irregular ceramic skeleton prescribed essentially by the pore and cell wall structure of the matrix body, said skeleton forming the ceramic body. The possible supply and passageways for any arbitrary fluids and that are practically no longer capable of being influenced afterwards.

The invention starts with the recognition that it is desirable, to be able to plan defined supply channels for fluid substances, which would essentially expand the possible applications of the ceramic body. A ceramic body with defined supply channels would, for example, permit introducing certain reactants into the pore system in targetted fashion and there permit reaction partners flowing and/or diffusing through the pore system to react.

Now, however, because of the fineness and high degree of brittleness of the ceramic skeleton forming the ceramic body, it is possible to lay out these types of supply channels later only with some disadvantages. In the attempt to establish these types of supply channels, possibly by drilling or similar processes, in the finished ceramic body, occurring is considerable destruction of the pore system, blockage of pores by drilling dust, broken pieces, or similar, and possibly even extensive destruction of the ceramic body.

Therefore, the task for the invention is to obtain a process for producing open pore ceramic bodies of the initially mentioned art that are provided with defined supply channels, without the disadvantages described.

A further task for the invention consists of making ready an open pore matrix body suitable for the production of this type of open pore ceramic body. Furthermore, also a task for the invention is to obtain an open pore ceramic body that is provided with supply channels without any noteworthy disturbance of its pore system. Additionally, also the task for the invention is to give possibilities for application for a ceramic body of this type.

SUMMARY OF THE INVENTION

For resolving these tasks, the process for the production of open pore ceramic bodies of the initially mentioned art displays, in accordance with the invention.

Before curing the ceramic mass, the matrix body is supplied with filaments extending, at least in one spatial direction, into this matrix body, which are removed during or after curing the ceramic mass while forming appropriate channels, obtained without any noteworthy expense and without disturbing the pore system of the ceramic body are the desired supply channels that enable the targetted introduction of substances into the inside of the ceramic body.

Preferentially, an open pore matrix body is provided with filaments, preferentially threads made of thermically volatilizable material and/or capable of being decomposed into gaseous products. Preferred here, for one thing, are synthetic materials that can be evaporated, or be decomposed and essentially without residue, at such relatively low temperatures that lie below the temperature to be used for removal of the matrix body. However, it is also possible to use for the filaments materials that are removable just above the temperature at which the matrix body itself is removed, provided that the overtemperature to be applied does not lead to a disadvantageous influencing of the ceramic body.

In place of thermically removable filaments, also capable of being used are wires, preferentially metal wires, that can, after hardening of the ceramic mass, be dissolved by chemical means or mechanically pulled out. Suitable for mechanically removable filaments are plastic materials that are not capable of being wetted, or that can be wetted only with difficulty, such as perhaps polytetrafluoroethylene (Teflon). In place of obtaining channels of like diameters, which are sufficient for most applications, also capable of being obtained in cases of need are different supply channel systems by using filaments of different thicknesses. The filaments and, therewith, the channels provided in the ceramic body need not necessarily extend in the same spatial direction, but can rather, for example, also run in different spatial directions for supplying different reactants.

The object of the invention is furthermore an open pore matrix body for the production of an open pore ceramic body like. Furthermore, also the object of the invention is the open pore ceramic body that is capable of being produced based on the process described, as well as the use of this type of open pore ceramic body.

BRIEF DESCRIPTION OF THE DRAWINGS

Explained in more detail in the following with the aid of the accompanying drawings are preferred forms of embodiment of the invention. Shown are.

DETAILED DESCRIPTION OF THE INVENTION

When producing open pore ceramic bodies known open pore matrix bodies are used as a starting point. Besides using fiber bodies, as for example felt-like materials, used in particular as matrix bodies are reticular, open pore plastic foams and, here, in particular, open pore polyurethane foams.

Figure 1A:
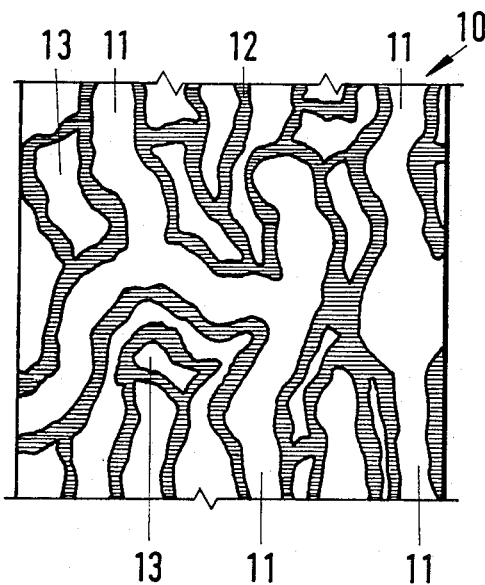
FIG. 1a–c in schematic form, some of the production steps for a known open pore ceramic body.

FIG. 1a shows in strongly schematic form an enlarged section of an open pore matrix body 10 formed from plastic foam. This latter displays penetrating, open pores 11 that are defined by wall areas 12 consisting of the plastic material of the matrix body. Also formed by wall areas made of the plastic material of the matrix body are non-penetrating, but rather more to the point completely enclosed, gas filled cells 13 that do not communicate with the open pores 11.

Figure 1B:
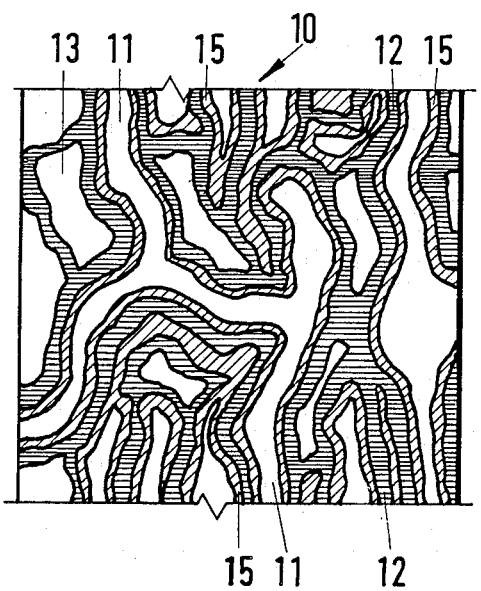

After immersing the matrix body of FIG. 1a into a suitable, fluid ceramic mass, in particular in a paste of finely distributed ceramic particles, open pores 11 of the matrix body 10 are filled with the fluid ceramic mass. After taking the matrix body 10 out of the ceramic mass and removal of the unneeded excess of ceramic mass from the open pores 11, for example by expressing the matrix body 10, essentially covered in a thin layer with fluid ceramic mass are only the inner wall areas of the matrix body, that is to say the limiting surface of the pores, as is indicated in FIG. 1b with crosshatching. With correspondingly greater capillary action, however, remaining are individual regions of open pores 11 that display correspondingly small diameters, that remain filled with ceramic mass even after expressing. It is understood that the cells 13 completely enclosed by wall areas 12 do not fill with ceramic mass.

Figure 1C:
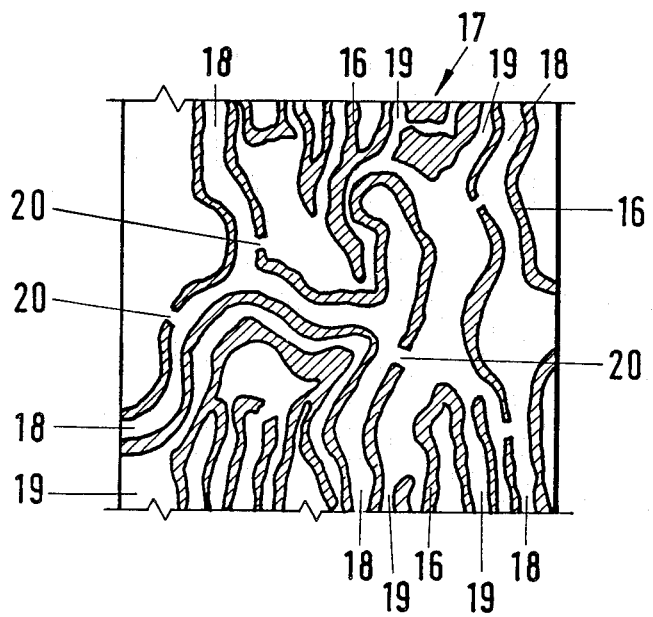

Next, the matrix body provided in desired fashion with fluid ceramic mass is heated, whereby the ceramic mass is hardened and, possibly, with a sufficient temperature while sintering, is cured. In doing this, the volatilizing and/or decomposing temperature of the plastic material of which the matrix body 10 consists is knowingly overshot, so that the matrix body 10 is removed by evaporating or decomposing into gaseous substances. Remaining behind is a ceramic skeleton 16 forming the ceramic body 17 which, as shown in FIG. 1c, essentially represents the spatial arrangement of open pores 11 of the now no longer present matrix body 10. This ceramic skeleton forms a first pore system 18 of penetrating, open pores that correspond, with a reduced diameter about the wall thickness of the ceramic skeleton 16, the open pores 11 of the matrix body 10.

Addtionally, however, the ceramic body 17 displays yet another pore system 19. This latter arises by removal of the wall area 12 of the matrix body 10 in which appears a hollow space system in place of wall area 12.

While the volume of the first pore system 18, reduced by the amount of the wall thickness of the ceramic skeleton 16, corresponds to the volume of the open pores 11 of the matrix body 10, the volume of the second pore system 19 of the ceramic body 17 is determined on the one hand by the space requirement of the wall region 12 of the matrix body 10, on the other hand, however, additionally by the no longer existing cells 13 of the matrix body 10 after removing the wall area 12. If the matrix body 10 displays unusually many and/or unusually comprehensive cells 13, then the total volume of the second pore system 19 can be a multiple of the volume of the first pore system 18.

In the case of thermal removal of the matrix body 10, its material is practically completely converted into gaseous substances. These escape in part outside the ceramic skeleton 16; in part, however, under the pressure that arises, they also produce passthrough openings 20 in the walls of the ceramic skeleton 16 and then escape through the open pores of the first pore system 18. The significance of the passthrough openings 20 between the first and the second pore system arising thereby will be gone into later.

Figure 2:
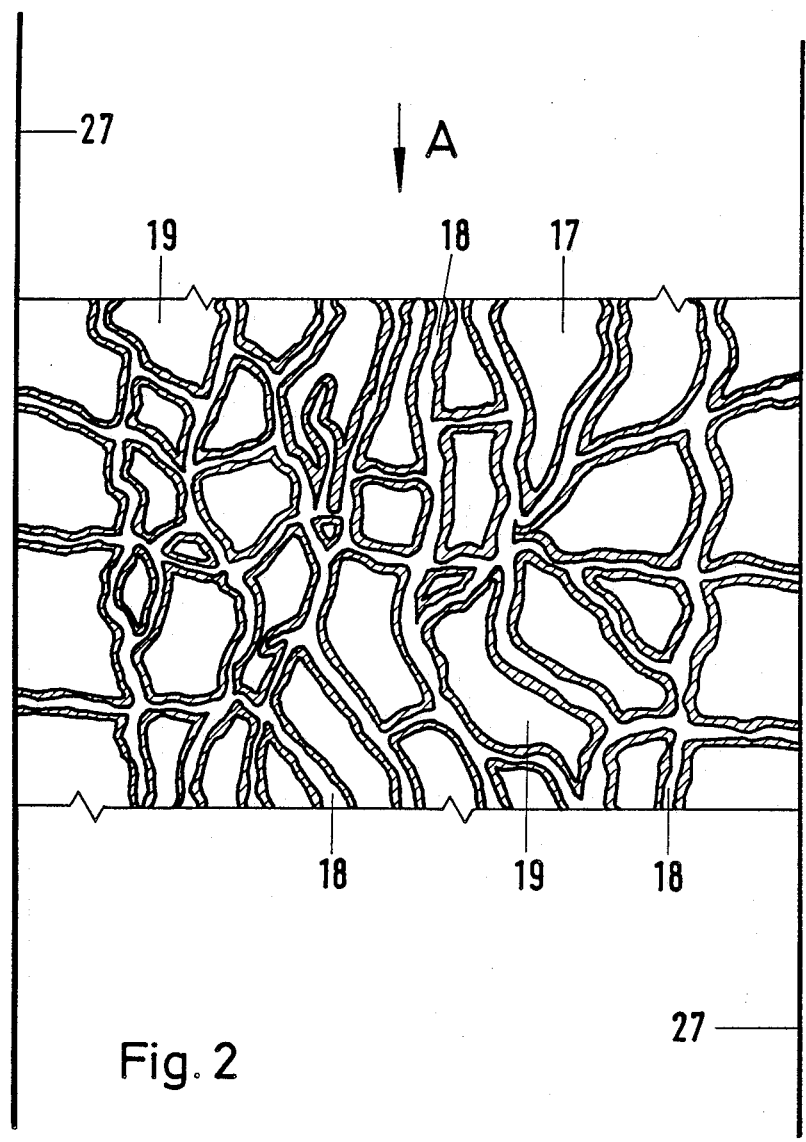
FIG. 2 schematically, a known type open pore ceramic body in application.

FIG. 2 shows a typical application for a known ceramic body 17 of this type. Here, the ceramic body 17 is enclosed between walls 27, so that only the pores passing through in the direction of arrow A are available for passage of a liquid or an appropriate gas supplied, from above in FIG. 2, in the direction of arrow A. In the case of customarily used matrix bodies, the width of the pore system 18 generated in the ceramic body 17 is much greater than that of the second pore system 19, so that the throughput of substance through the ceramic body 17 in the direction of arrow A is accomplished essentially by means of the first pore system 18.

The ceramic body in accordance with FIG. 2 serves, as an example, for filtering a molten metal that is supplied in the direction of arrow A and, upon passing through the pores of the ceramic body 17, eventually leaves behind impurities.

However, by bringing in impurities into the open pores of the ceramic body 17, occurring in operation after a shorter or longer period of time are blockages that increasingly reduce the permeability of the ceramic body 17 and finally lead to its uselessness. In this case, the ceramic body 17 must again be rid of impurities by treatment with appropriate chemicals; these chemicals are supplied to the ceramic body 17 in place of the material to be filtered, in order to dissolve out the impurities from the pores. The action times up until appropriate cleaning of the pores are long and the corresponding dropout (interruption) of operating time is considerable, since the chemicals can infiltrate only slowly through the plugged-up pores.

The ceramic body 17 could also be used for cleansing unpurified gases if it would be possible to introduce into its pores the substances required for washing gas in targetted fashion such that these substances come into intimate contact with the gas to be cleansed. In the case of the ceramic body 17 of known construction that allows passage only in one direction, like is shown in FIG. 2, simultaneous introduction of unpurified gas and washing fluid is not effective.

Figure 3A:
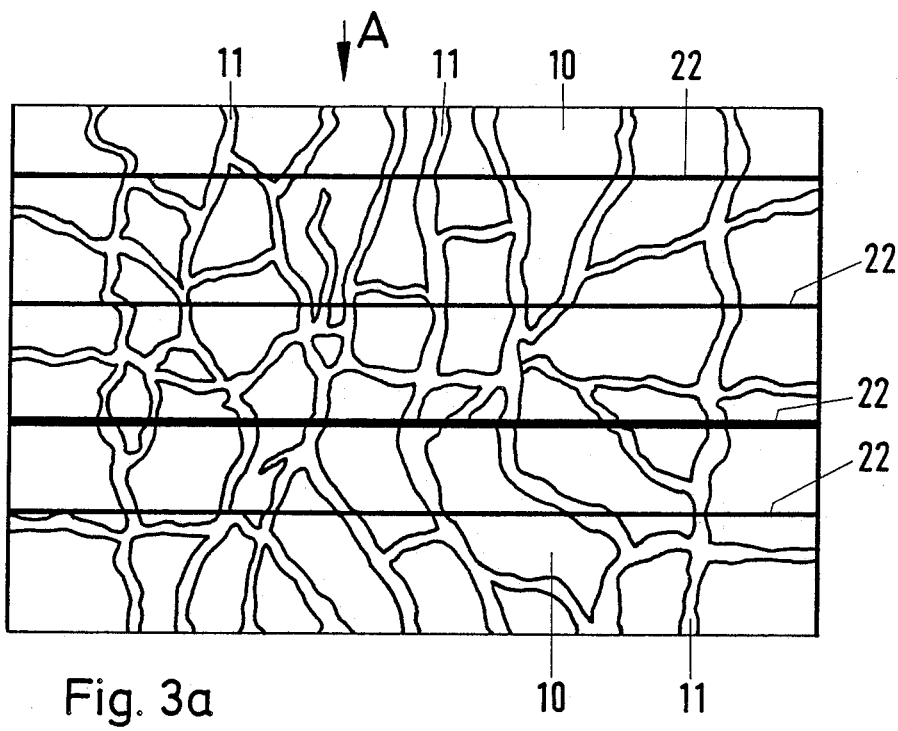
FIG. 3a–3b schematically, two forms of embodiment of an open pore matrix body in accordance with the invention and FIG. 4 schematically, an open pore ceramic body in accordance with the invention in its state of usage.
Figure 4:
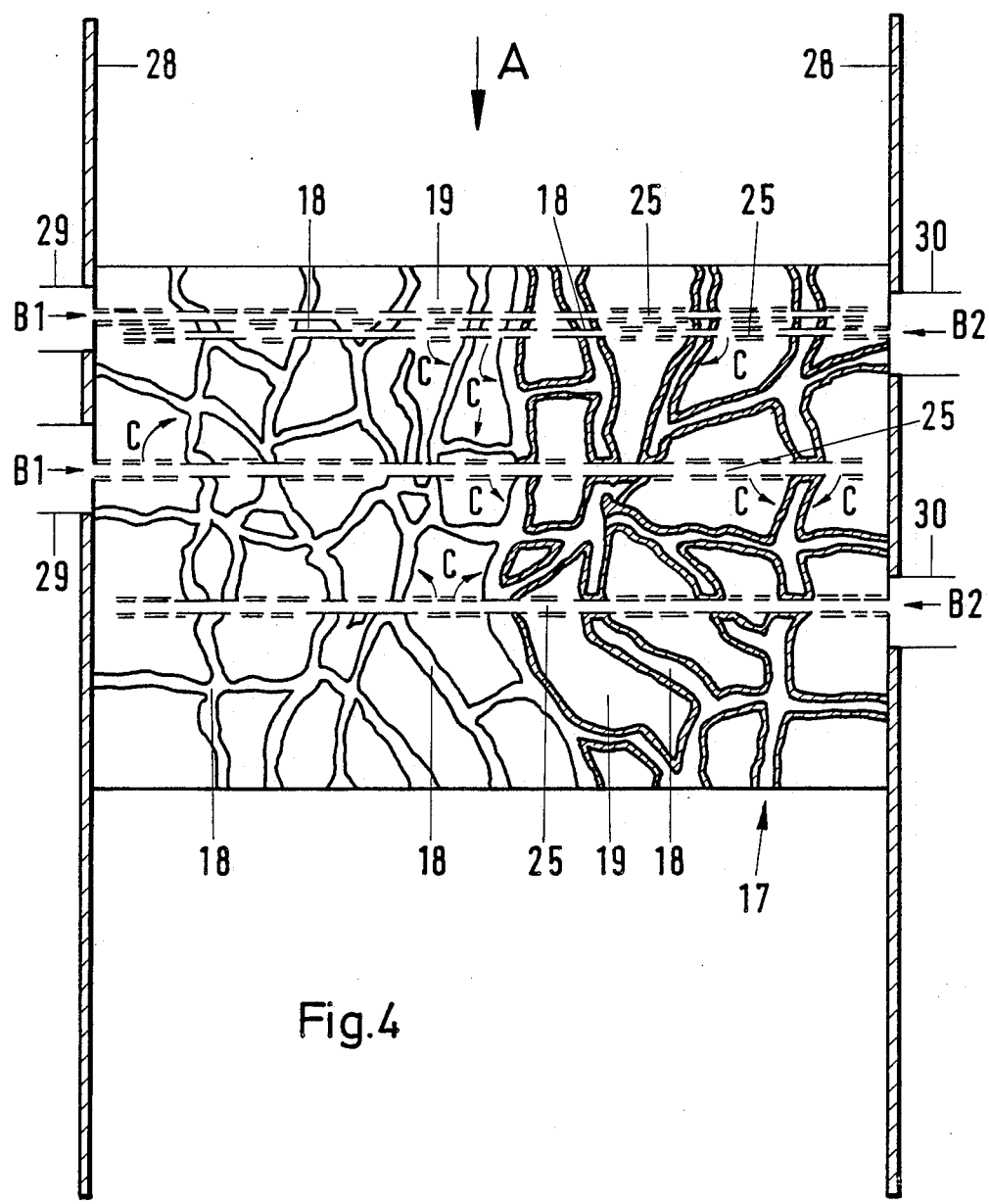

Therefore, the ceramic body 17 is provided with channels 25, like are shown in FIG. 4. For this purpose, the open pore matrix body 10, as shown schematically in FIG. 3a, is provided with filaments extending transversally to the principal flowthrough direction A, provided for their later use.

In FIG. 3a, we are dealing here with threads 22 of different thicknesses which, when using a matrix body 10 made of reticulated polyurethane foam, preferentially consist of wools. The threads 22 are pulled through the matrix body 10 over its entire width and thereby intersect a plurality of penetrating open pores 11.

When immersing the matrix body into the fluid ceramic mass, this latter penetrates into the open pores 11 that go all the way through and wets not only the contacting surfaces, but also the outer surfaces of the threads 22 lying free in the area of the open pores 11. On the other hand, the threads 22 are not wetted by the ceramic mass unless they extend inside wall areas 12 of the plastic material or through closed cells 13. At the time of subsequent removal of excess fluid ceramic mass, remaining behind in each case in the area of a penetrating open pore 11 is a layer of ceramic material about the outer surface of thread 22 in question, so that at the time of the next thermal removal of the matrix body 10, a tubular portion of ceramic skeleton remains behind, there where the thread 22 has extended through the open pore 11. This ceramic skeleton portion essentially closes off the inside of channel 25 against communication with the inside of the first pore system 18 corresponding to the open pores 11 of the matrix body 10, in the case of the now formed ceramic body 17, so that this pore system is essentially not accessible via the channels 25.

However, in comparison to the second pore system 19 of the ceramic body that arises by removal of the wall areas 12 and cells 13 of the matrix body 10, channels 25 are open, as is indicated by crosshatching in FIG. 4, so that they communicate with the second pore system 19 of the ceramic body 17. It is therefore possible, by means of channels 25, to introduce, in targetted fashion, fluid substances into the second pore system 19 of the ceramic body 17, as will be explained in more detail later with the aid of FIG. 4.

Figure 3B:
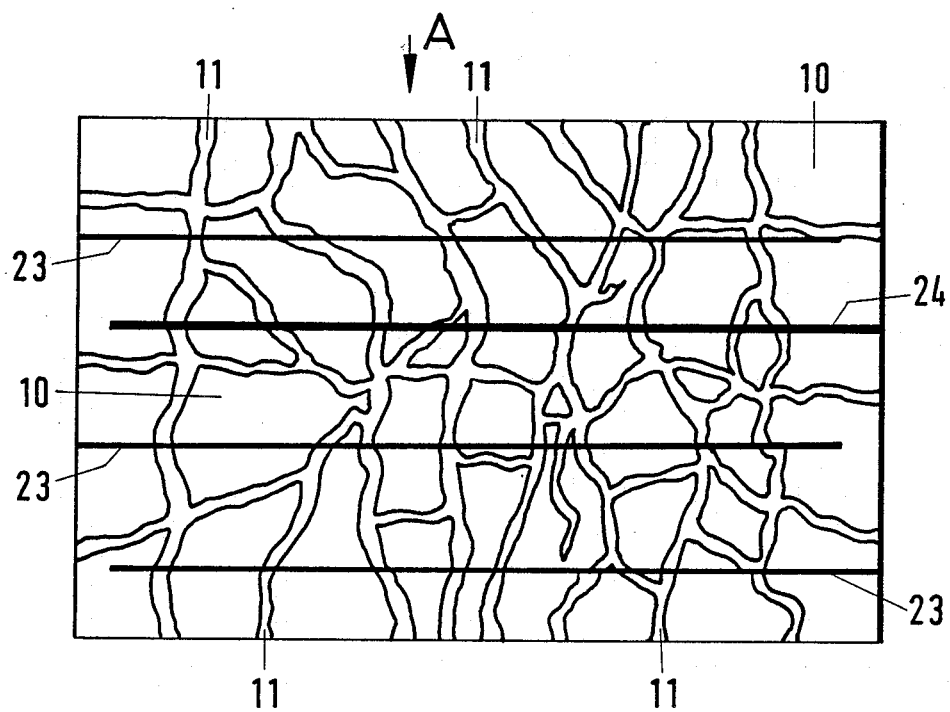

FIG. 3b shows a modified form of embodiment of the matrix body 10 wherein, instead of threads 22, introduced into the matrix body 10 are wire-like filaments 23, 24 such that they extend through it over the greatest portion of its width, but do not penetrate completely through it.

Provided here as filaments are metal wires 23 that remain behind in the ceramic body 17 when thermically removing matrix body 10, and that are subsequently removed therefrom, while forming channels 25 (FIG. 4), by dissolving in a suitable acid. Besides this, used as a filament is a Teflon rod 24 which, after hardening of the ceramic mass before its sintering and leaving behind a channel 25, is pulled out laterally from matrix body 10.

FIG. 4 shows a ceramic body 17 in accordance with the invention that has been prepared for use and that is enclosed between walls 28 such that there are available penetrating open pores of its first pore system 18 and possibly, with appropriate diameters, also penetrating open pores of its second pore system 19 for a fluid introduced in the direction of arrow A to pass through the ceramic body 17. Walls 28 are provided with first and second feed stubs 29 and 30, each of which connects to channels 25 that do not penetrate over the entire width of the ceramic body 17, through a feed system that is not shown. It is possible by this that a first fluid substance $B_1$ be brought in via the first feed stub 29 and/or a second fluid substance $B_2$ be brought in via the second feed stub 30 and into the two channels 25 associated therewith, into the inside of the ceramic body 17. Since these fluids $B_1$, respectively $B_2$, because of the rather complete closure of channels 25 relative to the first pore system, do not pass directly into this latter but rather into the second pore system 19, the fluid substances $B_1$, respectively $B_2$ supplied essentially reach the second pore system 19. However, out from this latter, passage of the fluid substances $B_1$, respectively $B_2$, into the first pore system 18 is nevertheless possible because the first pore system 18 communicates with the second pore system 19, as is shown schematically in FIG. 1c, through individual passthrough openings 20 that have been opened by the gases escaping when removing the matrix body 10. This process is indicated schematically in FIG. 4 by means of arrows C.

Now, if for example an unpurified gas is supplied in the direction of the arrow A to the ceramic body 17 shown in FIG. 4, then the washing fluid $B_1$ and/or $B_2$ required for eliminating the impurities can be introduced via the first and/or the second feed stub 29 and/or 30 and associated channels 25 into the second pore system 19 of the ceramic body, and then passes over into the first pore system 18 through passthrough openings 20 (FIG. 1c), in which flow of the unpurified gas through the ceramic body 17 essentially takes place. The impurities deposited on the ceramic walls of the first pore system 18 are eliminated by washing liquid such that they reach the wall areas of the first pore system 18 via passthrough openings 20. Taking place simultaneously by wetting the contacting walls of the first pore system 18 with washing liquid is a contact of the unpurified gas over so great a total surface area that a thorough cleansing of the unpurified gas is enabled inside the ceramic body 17. The washing liquid then runs over the pores of the first and of the second pore system 18 and 19, downwardly in FIG. 4.

The ceramic body 17 in accordance with the invention, besides the application for cleaning gases, is suited for a plurality of other usages.

Thus, it is possible, for example, to apply it for filtering unpurified metallic fluids, whereby, for example, for removal of oxidized substances dissolved in the metal (for example sulfur, carbon and the like), a suitable oxidizing gas can be supplied via channels 25. Solid impurities can be removed by means of a solvent supplied via channels 25.

Conversely, it is naturally also possible to bring a substrate flowing through the pores of the ceramic body 17 into contact with a reducing reactant via channels 25. Besides decomposition of impurities, it is also possible to operate the ceramic body 17 as a reactor in which suitable reactants can be brought to reaction (made to react) in targetted fashion in its system of pores.

Layout and appropriate connection of corresponding channels to associated supply (feed) means also makes it possible to bring different reactants into reaction with substrates in a timed sequence by supplying reactants to the channels lying in the upstream flow direction, which are first brought into reaction with the fluid flowing through, and then bringing the product of reaction into reaction with other substances through other channels 25 lying in the downstream flow direction.

The pore systems of the ceramic body in accordance with the invention are further suited also in particular for catalytic reactions, with catalyzing substances being brought into the pore system and there being loaded (covered) in targetted fashion with reactants via the pore systems 18, 19 and the channels 25.

It is claimed:

1. A process for the manufacture of open pore ceramic bodies having a wall structure and with a plurality of random passages therethrough and a plurality of lateral channels in communication with said passages, to permit infusion or removal of fluids into said ceramic bodies, via said channels, comprising the steps of:
   (a) applying a hardenable ceramic mass throughout the accessible surfaces and pores of an open pore matrix body, thereby defining a first set of random passages through said matrix body and a plurality of closed cells,
   (b) before hardening of said mass, inserting a plurality of filaments into said mass, said filaments extending to an edge of said mass,
   (c) permitting said hardenable mass to flow along said filaments, thereby bridging at least some of passages,
   (d) removing the unneeded excess hardenable mass from said matrix body, so that said walls of the body are coated with a thin layer of hardenable mass,
   (e) hardening said mass and producing openings in said closed cells by causing gases trapped in said cells to expand, said opened cells now forming together a second said of random passages through said matrix body,
   (f) removing said matrix body and filaments from said mass to form a plurality of channels into said mass for transmission of fluids therethrough.

2. The process according to claim 1 wherein the matrix body is thermally decomposable and wherein the filaments are made of thermically volatilizable material and including the step of decomposing both the matrix body and filaments into gaseous products.

3. The process according to claim 1 wherein the filaments are converted into gaseous products.

4. The process according to claim 1 wherein the filaments are made of natural fibers capable of being removed thermally while decomposing.

5. The process according to claim 1 wherein the filaments are metal wires and including the step of dissolving the wires after hardening by the use of acids which do not attack the ceramic mass.

6. The process according to claim 1 wherein the filaments are wires which do not adhere to the ceramic mass, and including the step of pulling the wires out of the mass after hardening.

7. The process according to claim 1 wherein said filaments include a plurality of filaments of differing thicknesses and materials.

8. The process according to claim 1 wherein said at least one filament includes a plurality of filaments extending through the mass in different spatial directions.

* * * * *

UNITED STATES PATENT AND TRADEMARK OFFICE
CERTIFICATE OF CORRECTION

PATENT NO. : 4,970,035

DATED : 13 November 1990

INVENTOR(S) : Kurt Baarsch

It is certified that error appears in the above-identified patent and that said Letters Patent is hereby corrected as shown below:

Column 1, line 57 delete "The possible supply and passageway for any arbitrary fluids are practically no longer capable of being influenced afterwards." after the word "body".

Column 3, line 3 delete "like" after the word "body".

Signed and Sealed this

Seventeenth Day of November, 1992

Attest:

DOUGLAS B. COMER

*Attesting Officer*  *Acting Commissioner of Patents and Trademarks*